(12) United States Patent
Aruga

(10) Patent No.: US 9,866,823 B2
(45) Date of Patent: Jan. 9, 2018

(54) HEAD MOUNTED DISPLAY DEVICE, CONTROL METHOD FOR HEAD MOUNTED DISPLAY DEVICE, AND COMPUTER PROGRAM

(71) Applicant: SEIKO EPSON CORPORATION, Tokyo (JP)

(72) Inventor: Naoto Aruga, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 113 days.

(21) Appl. No.: 14/952,298

(22) Filed: Nov. 25, 2015

(65) Prior Publication Data

US 2016/0156900 A1 Jun. 2, 2016

(30) Foreign Application Priority Data

Dec. 2, 2014 (JP) ................................ 2014-243775

(51) Int. Cl.
| | |
|---|---|
| *H04N 13/04* | (2006.01) |
| *G06T 19/20* | (2011.01) |
| *H04N 13/00* | (2006.01) |
| *G02B 27/01* | (2006.01) |
| *G06T 19/00* | (2011.01) |

(52) U.S. Cl.
CPC ....... *H04N 13/044* (2013.01); *G02B 27/0172* (2013.01); *G02B 27/0179* (2013.01); *G06T 19/006* (2013.01); *H04N 13/0022* (2013.01); *H04N 13/0497* (2013.01); *G02B 2027/014* (2013.01); *G02B 2027/0134* (2013.01); *G02B 2027/0138* (2013.01); *G02B 2027/0185* (2013.01); *H04N 2213/002* (2013.01)

(58) Field of Classification Search
CPC .......... H04N 13/0022; H04N 13/0033; H04N 2213/002; H04N 13/0018; H04N 13/044; H04N 2013/0081; G06T 7/70; G06T 7/97; G06T 19/20; G02B 2027/0138
See application file for complete search history.

(56) References Cited

U.S. PATENT DOCUMENTS

| | | | | |
|---|---|---|---|---|
| 6,507,359 B1* | 1/2003 | Muramoto | ............. | H04N 5/772 |
| | | | | 345/8 |
| 2007/0201847 A1* | 8/2007 | Lei | ..................... | G02B 27/0093 |
| | | | | 396/51 |

(Continued)

FOREIGN PATENT DOCUMENTS

| | | |
|---|---|---|
| JP | 2006-195084 A | 7/2006 |
| JP | 2011-205195 A | 10/2011 |
| JP | 2012-013940 A | 1/2012 |

*Primary Examiner* — Sultana M Zalalee
(74) *Attorney, Agent, or Firm* — Oliff PLC

(57) ABSTRACT

A transmission type head mounted display device includes a distance measuring unit that measures a distance to a specific point in an outside scene, an image display unit that is capable of transmitting the outside scene and displays an image, and an image setting unit that controls the image display unit such that the image can be stereoscopically displayed at the position of measured distance, and in a case where the measured distance is changed, sets the image stereoscopically displayed at the position of the distance measured before the change as the image to be stereoscopically displayed at the position of the distance measured after the change over a time longer than a time required for the measured distance be changed.

11 Claims, 10 Drawing Sheets

(56) References Cited

U.S. PATENT DOCUMENTS

| | | | |
|---|---|---|---|
| 2011/0081042 A1* | 4/2011 | Kim .................. | H04N 13/0022 |
| | | | 382/100 |
| 2012/0320038 A1* | 12/2012 | Harada .............. | H04N 13/0022 |
| | | | 345/419 |
| 2013/0100257 A1* | 4/2013 | Sawachi ............ | H04N 13/0246 |
| | | | 348/49 |
| 2015/0070477 A1* | 3/2015 | Taki .................. | H04N 13/0022 |
| | | | 348/56 |

* cited by examiner

HEAD MOUNTED DISPLAY DEVICE, CONTROL METHOD FOR HEAD MOUNTED DISPLAY DEVICE, AND COMPUTER PROGRAM

BACKGROUND

1. Technical Field

The present invention relates to a head mounted display device.

2. Related Art

A head mounted display device (HMD) that is a display device mounted on a head is known. The head mounted display device, for example, generates an image light using a liquid crystal display and a light source, guides the generated image light to the eyes of a user using a projection optical system and a light guide plate, and causes the user to visually recognize a virtual image. Of the head mounted display device, there are two types: a transmission type device with which the user can visually recognize an outside scene in addition to the virtual image and a non-transmission type device with which the user cannot visually recognize the outside scene. There are two types of the transmission type head mounted display device: an optical transmission type head mounted display device and a video transmission type head mounted display device.

In JP-A-2006-195084, a technology is disclosed, in which a state of retina of the eyes of the user seeing the image displayed in the display device is detected, a region where the user is seeing in the display image is specified based on the detected state of the retina, and then, regions except the region where the user is seeing are blurred. In JP-A-2011-205195, a technology is disclosed, in which, in an image processing device that enables the user to stereoscopically and visually recognize a two-dimensional image by making the display image for the left eye and the display image for the right eye different from each other, a parallactic angle becomes equal to or greater than a certain level, which is a difference between a convergence angle of the user when the stereoscopic image is visually recognized and a convergence angle of the user when a display screen of a two-dimensional image which is different from the stereoscopic image is visually recognized. In addition, in JP-A-2012-13940, a technology is disclosed, in which, in a display device capable of displaying the display image for the left eye and the display image for the right eye, a character image such as a sub-title is displayed such that the convergence angle is formed, which matches the convergence angle of the display image visually recognized by the user.

As disclosed in JP-A-2011-205195, when significantly changing the convergence angle of the user, there has been a problem in that a tired feeling is given to the user. However, in the technology disclosed in JP-A-2006-195084, JP-A-2011-205195, and JP-A-2012-13940, a display mode of a display device according to a change of a direction of line of sights of the user who visually recognizes the display image is not considered. Therefore, there has been room for improvement for a method of causing the user to stereoscopically and visually recognize the display image. In addition, in the technical field of the display device in the related art, it has been desired to minimize size, to make it easy to manufacture, and to improve usability.

SUMMARY

An advantage of some aspects of the invention is to solve the problems described above, and the invention can be implemented as the following forms.

(1) An aspect of the invention provides a transmission type head mounted display device. This type of head mounted display device includes: a distance measuring unit that measures a distance to a specific point in an outside scene; an image display unit that is capable of transmitting the outside scene and displays an image; and an image setting unit that controls the image display unit such that the image can be stereoscopically displayed at the position of measured distance, and in a case where the measured distance is changed, sets the image stereoscopically displayed at the position of the distance measured before the change as the image to be stereoscopically displayed at the position of the distance measured after the change over a time longer than a time required for the measured distance to be changed. According to the head mounted display device of this aspect, even when the distance to the subject in the outside scene which is visually recognized by the user is changed, the image is not instantaneously displayed stereoscopically according to the distance after the change. Therefore, it is possible to suppress the tiredness of the user in a case where the user changes his line of sight. In addition, it is possible to reduce the feeling of discomfort due to the change of the stereoscopical image which is visually recognized by the user before and after changing the line of sight.

(2) In the head mounted display device of the aspect, the distance measuring unit may include an outside scene imaging unit that captures an image of the outside scene and may set a center of the captured image as the specific point. According to the head mounted display device of this aspect, it is possible to easily estimate the specific position where the user is visually recognizing without performing complicated data processing on a state of the eyeballs of the user.

(3) In the head mounted display device of the aspect, in a case where the change of the distance to the center of the captured image is less than a predetermined distance, the image setting unit may not change the distance at which the image is stereoscopically displayed on the image display unit. According to the head mounted display device of this aspect, in a case where the amount of change of the distance to the subject in the outside scene which is visually recognized by the user is small, the distance from the user displaying the stereoscopic image is not changed. Therefore, it is possible to reduce the flickering of the image or the like generated by a minute change of the stereoscopic image.

(4) In the head mounted display device of the aspect, in a case where an amount of change of the measured distance is equal to or greater than the predetermined distance and in a case where a time to change is equal to or longer than a first threshold value, the image setting unit may fix the distance stereoscopically displayed on the image display unit to be the distance measured before the change, and in a case where a time equal to or longer than a second threshold value from the time when the measured distance is changed equal to or greater than the predetermined distance elapses, the image setting unit may set the distance of the image stereoscopically displayed on the image display unit to be the measured distance after the change. According to the head mounted display device of this aspect, in such a case where the user instantaneously changes the position at which he/she is looking during the time equal to or longer than the first threshold value, since change of the distance to the position of the image is not followed, it is possible to reduce the tiredness and the feeling of discomfort.

(5) In the head mounted display device of the aspect, the distance measuring unit may extract an image of a specific subject from the captured image of the outside scene and specify the distance to the extracted specific subject as a distance to the specific point, and the image setting unit may set an image to be stereoscopically displayed on the image display unit according to the extracted image of the specific subject. According to the head mounted display device of this aspect, since the image to be stereoscopically displayed on the image display unit is set according to the movement of the specific subject in the captured image, the specific subject and the display image can be recognized by the user while being more strongly associated with each other, and thus, the usability for the user is improved.

(6) In the head mounted display device of the aspect, the distance measuring unit may include an eye image capturing unit that captures images of the user's eyes, and may measure the distance to the specific point based on the captured images of the eyes. According to the head mounted display device, in addition to the distance to the specific point, since the direction of the line of sight of the user is also specified, a degree of freedom of the position for displaying the image is increased, and thus, the usability of the user is improved.

(7) In the head mounted display device of the aspect, in a case where the distance of the image stereoscopically displayed on the image display unit is changed, the image setting unit may set a speed of the change of the distance per unit time so as to gradually increase. According to the head mounted display device of this aspect, it is possible to further reduce the feeling of tiredness or discomfort to the user visually recognizing the stereoscopic image in which the distance to the position of displaying is changed.

(8) In the head mounted display device of the aspect, the image setting unit may cause the image displayed on the image display unit to be stereoscopically displayed at the position of the measured distance by setting a convergence angle between an image for the right eye and an image for the left eye which is different from the image for the right eye with respect to the image stereoscopically displayed on the image display unit. According to the head mounted display device of this aspect, by changing the position of each pixel of the image displayed on the right optical image display units such that a predetermined convergence angle is formed, it is possible to easily cause the image to be stereoscopically and visually recognized by the user.

(9) In the head mounted display device of the aspect, in a case where the convergence angle when the measured distance is changed is equal to or greater than a predetermined angle, the image setting unit may change the distance of the image stereoscopically displayed on the image display unit. According to the head mounted display device of this aspect, in a case where the amount of change of the distance to the specific position in the outside scene which is visually recognized by the user is small, the distance from the user displaying the stereoscopic image is not changed. Therefore, it is possible to reduce the flickering of the image or the like generated by a minute change of the stereoscopic image.

Not all of a plurality of configuration elements in each of the above-described aspects of the invention is essential. In order to achieve a part or all of the effects described herein, a change, a deletion, a substitution with other new configuration elements and a partial deletion of the limiting content can appropriately be performed regarding a part of the plurality of configuration elements. In addition, in order to achieve apart or all of the effects described herein, by combining a part or all of the technical features included in an aspect of the invention described above with a part or all of the technical features included in another aspect of the invention described above, an independent aspect of the invention can be made.

For example, an aspect of the invention can be implemented as a device that includes one or two or more elements among three elements of the distance measuring unit, the image display unit, and the image setting unit. That is, the device may or may not include the distance measuring unit. In addition, the device may or may not include the image display unit. In addition, the device may or may not include the image setting unit. The distance measuring unit, for example, may measure the distance to a specific point in the outside scene. The image display unit, for example, is capable of transmitting the outside scene and may display the image. The image setting unit, for example, may control the image display unit such that the image can be stereoscopically displayed at the position of measured distance, and in a case where the measured distance is changed, may change the image stereoscopically displayed at the position of the distance measured before the change to the image to be stereoscopically displayed at the position of the distance measured after the change over a time longer than a time required for the measured distance to be changed. This device, for example, can be implemented as the head mounted display device, but can also be implemented as another device other than the head mounted display device. According to the aspect like this, it is possible to solve at least one of the various objects such as an improvement and simplification of the operability of the device, integration of the device, and an improvement of the convenience of the user using the device. Any of the above-described parts or all of the technical features in each aspect of the head mounted display device can be applied to this device.

The invention can be implemented in various forms other than the head mounted display device. For example, the invention can be implemented in the forms of: the control method for the head mounted display device, the information system that includes the head mounted display device, the computer program for implementing the control method for the head mounted display device and the information system, the storage medium that stores the computer program, a data signal incorporated in a carrier wave in which the computer program is included, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Head Mounted Display Device

Figure 1:
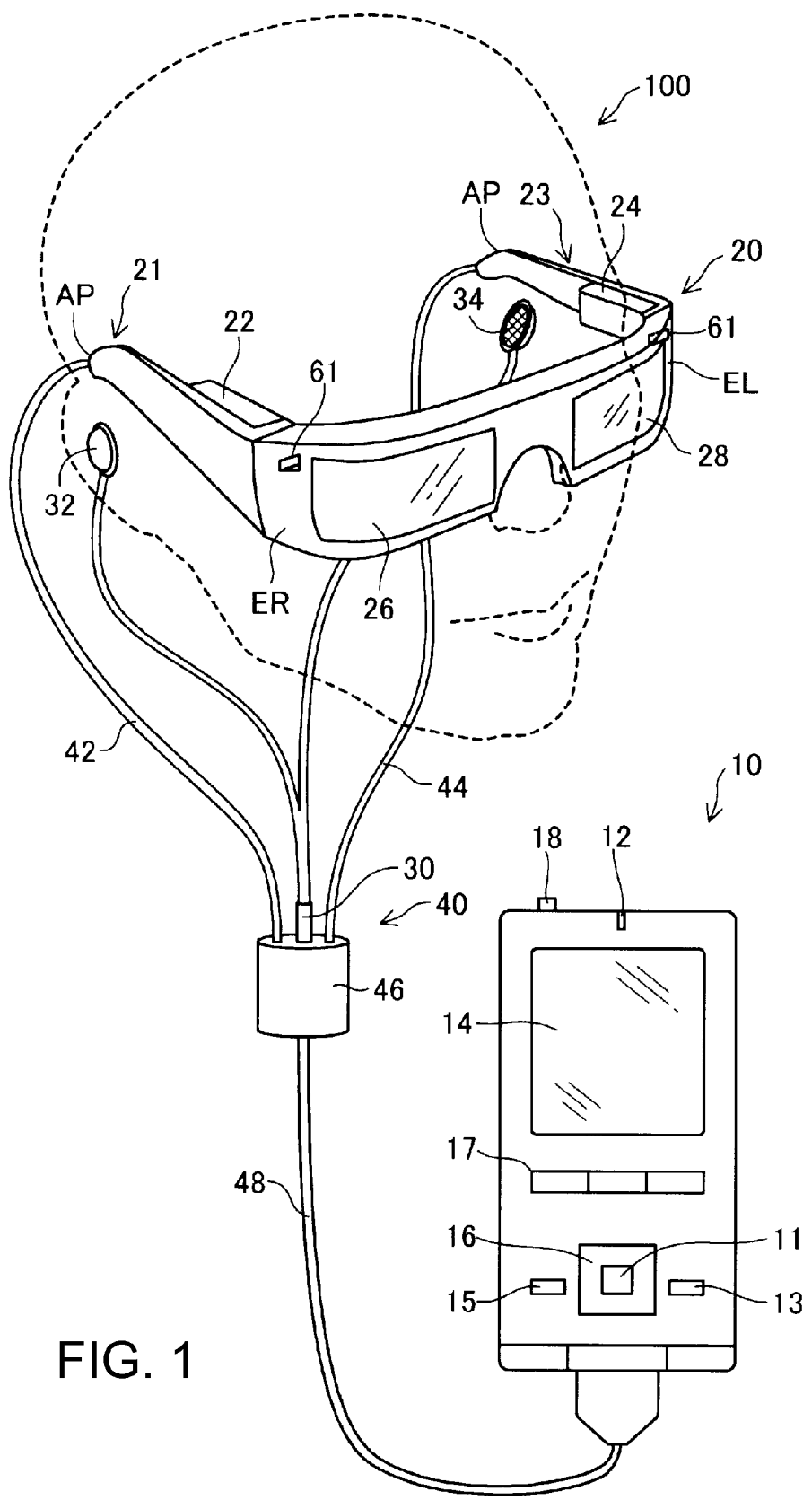
FIG. 1 is an explanatory diagram illustrating an external configuration of a head mounted display device (HMD).

FIG. 1 is an explanatory diagram illustrating an external configuration of a head mounted display device 100 (HMD 100). The HMD 100 is a display device mounted on a head and is also called a head mounted display. The HMD 100 in the present embodiment is an optical transmission type head mounted display device with which the user can directly and visually recognize an outside scene when the user visually recognizes a virtual image. In the present specification, the virtual image visually recognized by the user by the HMD 100 is also called "display image" for convenience.

The HMD 100 includes the image display unit 20 that causes the user to visually recognize the virtual image in the state of being mounted on the user's head and a controller 10 that controls the image display unit 20.

The image display unit 20 is a mounting body to be mounted on the user's head and has a glasses shape in the present embodiment. The image display unit 20 includes a right holding portion 21, a right display drive unit 22, a left holding portion 23, a left display drive unit 24, a right optical image display unit 26, a left optical image display unit 28, and a camera 61. The right optical image display unit 26 and the left optical image display unit 28 are respectively disposed so as to be positioned in front of the right and left eyes of the user when the user wears the image display unit 20. One end of the right optical image display unit 26 and one end of the left optical image display unit 28 are connected to each other at the position corresponding to the position between the eyebrows of the user when the user wears the image display unit 20.

The right holding portion 21 is a member provided to extend from an end portion ER which is the other end of the right optical image display unit 26 to a position corresponding to a side of the head of the user at the time when the user wears the image display unit 20. Similarly, the left holding portion 23 is a member provided to extend from an end portion EL which is the other end of the left optical image display unit 28 to a position corresponding to a side of the head of the user at the time when the user wears the image display unit 20. The right holding portion 21 and the left holding portion 23 hold the image display unit 20 on the head of the user in the form of temples of the glasses.

The right display drive unit 22 and the left display drive unit 24 are disposed on the side facing the user's head at the time when the user wears the image display unit 20. Hereinafter, the right holding portion 21 and the left holding portion 23 will be collectively and simply referred to as a "holding portion", the right display drive unit 22 and the left display drive unit 24 are collectively and simply referred to as a "display drive unit", and the right optical image display unit 26 and the left optical image display unit 28 are collectively and simply referred to as an "optical image display unit".

The display drive units 22 and 24 include liquid crystal displays 241 and 242 (hereinafter, referred to as "LCDs 241 and 242"), projection optical systems 251 and 252, or the like (refer to FIG. 2). Detailed configurations of the display drive units 22 and 24 will be described below. Optical image display units 26 and 28 as optical members include light guide plates 261 and 262 (refer to FIG. 2) and a dimming plate. The light guide plates 261 and 262 are formed of an optically transmissive resin material or the like, and guide the image light output from the display drive units 22 and 24 to the eyes of the user. The dimming plate is a thin plate-shaped optical element and is disposed so as to cover the surface side of the image display unit 20 which is a side opposite to the user's eyes. The dimming plate protects the light guide plates 261 and 262 and suppresses the damage of the light guide plates 261 and 262 or the adhesion of dirt, or the like. In addition, by adjusting the light transmittance of the dimming plate, the amount of external light that enters the user's eyes can be adjusted and then, the ease of the visual recognition of the virtual image can be adjusted. The dimming plate can be omitted.

The cameras 61 are stereo cameras respectively disposed at the end portion ER of the right optical image display unit 26 and the end portion EL of the left optical image display unit 28. As will be described below, a distance from the image display unit 20 to a target object included in a captured image is measured based on two captured images captured by each of the cameras 61.

The image display unit 20 further includes a connection portion 40 that connects the image display unit 20 to the controller 10. The connection portion 40 includes a main body cord 48 connected to the controller 10, a right cord 42, a left cord 44, and a connection member 46. The right cord 42 and the left cord 44 are cords in which the main body cord 48 is branched into two parts. The right cord 42 is inserted into a housing of the right holding portion 21 from a distal portion AP in the extending direction of the right holding portion 21, and is connected to the right display drive unit 22. Similarly, the left cord 44 is inserted into a housing of the left holding portion 23 from a distal portion AP in the extending direction of the left holding portion 23, and is connected to the left display drive unit 24. The connection member 46 is provided on the branch point of the main body cord 48 and the right cord 42 and the left cord 44, and has a jack for connecting an earphone plug 30. A right earphone 32 and a left earphone 34 extend from the earphone plug 30.

The image display unit 20 and the controller 10 perform the transmission of various signals via the connection portion 40. To each of the end portions on the opposite side of the connection member 46 in the main body cord 48 and the controller 10, connectors (not illustrated) fitted to each other are provided. The controller 10 and the image display unit 20 are connected to or separated from each other by fitting or releasing the connector of the main body cord 48 to/from the connector of the controller 10. For example, as the right cord 42, the left cord 44, and the main body cord 48, a metal cable or an optical fiber can be adopted.

The controller 10 is a device for controlling the HMD 100. The controller 10 includes a determination key 11, a lighting unit 12, a display switching key 13, a track pad 14, a brightness switching key 15, a direction key 16, a menu key 17, and a power switch 18. The determination key 11 detects a pressing operation and outputs a signal that determines the content operated in the controller 10. The lighting unit 12 notifies of the operation state of the HMD 100 according to the light emitting state thereof. For example, the power ON or OFF state or the like is the operation state of the HMD 100. For example, an LED is used as the lighting unit 12. The display switching key 13 detects the pressing operation, and for example, outputs a signal that switches display modes of the content moving picture to and from 3D and 2D. The track pad 14 detects the operation of the user's finger on the operation surface of the track pad 14, and outputs a signal that corresponds to the detected content. Various types of a track pad such as an electrostatic type, pressure sensing type, or an optical type can be adopted as the track pad 14. The brightness switching key 15 detects the pressing operation and outputs a signal that increases or decreases the brightness of the image display unit 20. The direction key 16 detects the pressing operation on the key corresponding to the up, down, right, and left direction, and outputs a signal that corresponds to the detected content. The power switch 18 switches the power-on state of the HMD 100 by detecting a sliding operation of the switch.

Figure 2:
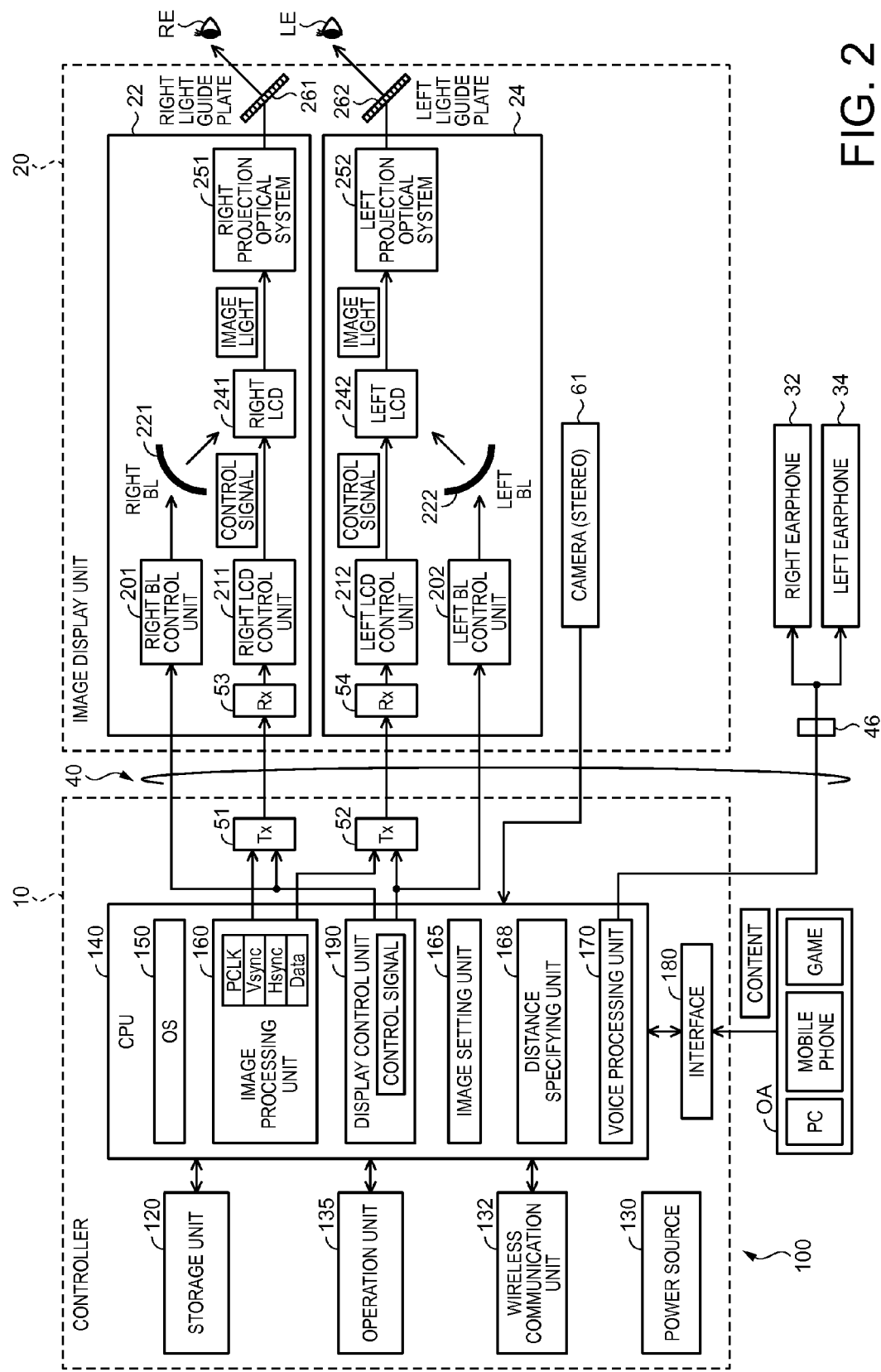
FIG. 2 is a block diagram functionally illustrating a configuration of the HMD.

FIG. 2 is a block diagram functionally illustrating a configuration of the HMD 100. As illustrated in FIG. 2, the controller 10 includes a storage unit 120, a power source 130, an operation unit 135, a wireless communication unit 132, a CPU 140, an interface 180, a transmission unit 51 (Tx 51), and a transmission unit 52 (Tx 52). The operation unit 135 receives the operation by the user and is configured to include the determination key 11, the display switching key 13, the track pad 14, the brightness switching key 15, the direction key 16, the menu key 17, and the power switch 18.

The power source 130 supplies power to each unit of the HMD 100. For example, a secondary battery can be used as the power source 130. The wireless communication unit 132 performs wireless communication with other devices such as a content server, a television, or a personal computer in accordance with a predetermined wireless communication method such as a wireless LAN or the Bluetooth. The storage unit 120 stores various computer programs. The storage unit 120 is configured to include a ROM, a RAM, or the like.

The CPU 140 functions as an operating system 150 (OS 150), a display control unit 190, a voice processing unit 170, an image processing unit 160, a distance specifying unit 168, and an image setting unit 165 by reading and executing the computer program stored in the storage unit 120.

The display control unit 190 generates a control signal that controls the right display drive unit 22 and the left display drive unit 24. Specifically, the display control unit 190 individually controls a drive ON/OFF of the right LCD 241 by a right LCD control unit 211, the drive ON/OFF of a right backlight 221 by a right backlight control unit 201, the drive ON/OFF of the left LCD 242 by a left LCD control unit 212, the drive ON/OFF of the left backlight 222 by a left backlight control unit 202 or the like, using the control signal. In this way, the display control unit 190 controls the generation and emission of the image light by each of the right display drive unit 22 and the left display drive unit 24. For example, the display control unit 190 causes both of the right display drive unit 22 and the left display drive unit 24 to generate the image light, causes only one of the display drive unit to generate the image light, or causes both of the display drive units not to generate the image light. "Generate the image light" is also referred to as "display the image".

The display control unit 190 transmits each control signal for the right LCD control unit 211 and the left LCD control unit 212 via the transmission unit 51 and the transmission unit 52, respectively. In addition, the display control unit 190 transmits each control signal for the right backlight control unit 201 and the left backlight control unit 202.

The image processing unit 160 acquires the image signal included in the content and transmits the acquired image signal to reception units 53 and 54 of the image display unit 20 via the transmission units 51 and 52. The image processing unit 160 may execute image processing tasks such as various tone correction processing tasks such as resolution conversion processing and adjustment of the brightness and the saturation, and keystone correction processing with respect to the image data, if necessary.

The voice processing unit 170 acquires a voice signal included in the content, amplifies the acquired voice signal, and supplies the signal to a speaker (not illustrated) in the right earphone 32 and a speaker (not illustrated) in the left earphone 34 connected to the connection member 46. For example, in a case where a Dolby® system is adopted, processing is performed on the voice signal and the different sounds of which, for example, the frequency or the like is changed are output from each of the right earphone 32 and the left earphone 34.

The distance specifying unit 168 specifies a distance from the image display unit 20 to a subject that appears in the captured image based on two captured images that are simultaneously captured from different positions using the camera 61 which is a stereo camera. The position on the image display unit 20 where the camera 61 is mounted and the angle of view of the camera 61 are set in advance. Therefore, the distance specifying unit 168 recognizes the subjects included in two captured images using a pattern matching or a statistical identification method, and then, calculates the distance to the recognized subject using trigonometry. In the present embodiment, the distance specifying unit 168 specifies the distance to the subject imaged at the center of the captured image. The distance specifying unit 168 in the present embodiment corresponds to a distance measuring unit in the aspects of the invention and the camera 61 corresponds to an outside scene imaging unit in the aspects of the invention. In addition, the subject imaged at the center of the captured image corresponds to a specific point in the aspects of the invention.

The image setting unit 165 performs control to display the captured image at the measured center of the captured image on the image display unit 20 such that the user visually recognizes the stereoscopic images. In a case where the distance to the measured center of the captured image is changed, the image setting unit 165 controls the image display unit 20 such that the user visually recognizes the stereoscopic images from the distance before the change to the distance after the change over a time longer than the time required for the measured distance to be changed. Specifically, the image setting unit 165 performs processing tasks described below. As an image stereoscopically recognized by the user, there is an image forming a convergence angle by making the image recognized by the right eye RE of the user and the image recognized by the left eye LE of the user be different from each other as described below in the present embodiment. As other images, various images can be applied to the invention such as an image in which the reflection of the brightness of the display image is changed, an image representing an overlapping of a plurality of objects, an image representing a magnitude relationship between a plurality of objects, an image in which a shadow of the object is added, and an image representing a mirror reflection.

The image setting unit 165 transmits a signal to the image display unit 20, which sets the display position of the three-dimensional image (3D image) to be stereoscopically displayed on the image display unit 20 among the image signals transmitted to the image display unit 20. The image setting unit 165 transmits the images to be displayed in 3D as such different data that the right-eye image data transmitted to the right display drive unit 22 and the left-eye image data transmitted to the left display drive unit 24 form the convergence angle, and then, the images are recognized as the 3D image by the user. In a case where the 3D image included in the content is in association with a related subject which is a specific subject detected from the captured image, the image setting unit 165 stereoscopically displays the 3D-image at the distance from the specified image display unit 20 to the related subject by forming the convergence angle. The image setting unit 165 forms the convergence angle by moving the RGB data of the 3D-image input to pixels of the right LCD 241 and the left LCD 242, and thus, the stereoscopic 3D-image is visually recognized by the user.

In some cases, the image captured by the camera 61 changes due to a change of the position or the direction of the user who wears the image display unit 20 on his/her head, and then, the subject imaged at the center of the captured image changes. In such a case, in a case where there is a 3D image which is in association with the related subject imaged at the center of the captured image after the change, the image setting unit 165 causes the 3D image to be displayed on the image display unit 20 according to the distance to the related subject. In the present embodiment, when the captured image changes, in a case where the distance to the center of the captured image changes by equal to or more than 10% which is a predetermined threshold value, the image setting unit 165 changes the convergence angle formed according to the distance to the related subject after the change. Specifically, for example, in a case where the distance to the related subject before the change is 10 meters (m), and when the distance to the related subject after the change is less than 9 m or equal to or longer than 11 m, the image setting unit 165 causes the 3D-image to be displayed on the image display unit 20 according to the distance to the related subject after the change. In a case where the distance to the related subject after the change is equal to or greater than 9 m and less than 11 m, the image setting unit 165 causes the 3D-image which is in association with the related subject after the change to be displayed at the distance to the related subject before the change on the image display unit 20. In other words, in a case where the distance to the related subject before and after the change is calculated as the convergence angle, when an amount of change of the calculated convergence angle is equal to or greater than a predetermined amount, the image setting unit 165 changes the convergence angle from the convergence angle before the change to the convergence angle after the change, and then, causes the 3D-image to be displayed on the image display unit 20. Conversely, when the amount of change of the calculated convergence angle is less than a predetermined amount, the image setting unit 165 causes the 3D-image on the image display unit 20 at the convergence angle before the change itself. The changes at the center of the captured image are changes in an infinitesimal time $\Delta t$, and the infinitesimal time $\Delta t$ is timely set according to the changes of a human line of sight. For example, the infinitesimal time $\Delta t$ may be 0.1 second or may be any length of time.

As the cases where the captured image is changed, specifically the following aspects before and after the change can be included.

(1) A case where the change of the distance to the center of the captured image is less than the threshold value and the related subject is not changed (2) A case where the change of the distance to the center of the captured image is less than the threshold value and the related subject is changed (3) A case where the change of the distance to the center of the captured image is equal to or greater than the threshold value and the related subject is not changed and (4) A case where the change of the distance to the center of the captured image is equal to greater than the threshold value and the related subject is changed The cases where the captured image is changed are not limited to the four cases described above, and there can be various modifications. For example, in the case of (2) and (4), in a case where the related subject before the change is detected at other than the center of the captured image after the change, the image setting unit 165 may or may not cause the 3D-image which is in association with the related subject before the change to be displayed on the image display unit 20 in accordance with the distance after the change measured by the distance specifying unit 168.

In a case of (1), when the related subject is moved after the change, the image setting unit 165 causes the 3D-image to be displayed on the image display unit 20 according to the related subject after the movement. Since the distance before and after the change is less than the threshold value, the image setting unit 165 does not change the convergence angle. In a case of (2), the image setting unit 165 causes the 3D-image which is in association with the related subject after the change to be newly displayed on the image display unit 20.

Figure 3:
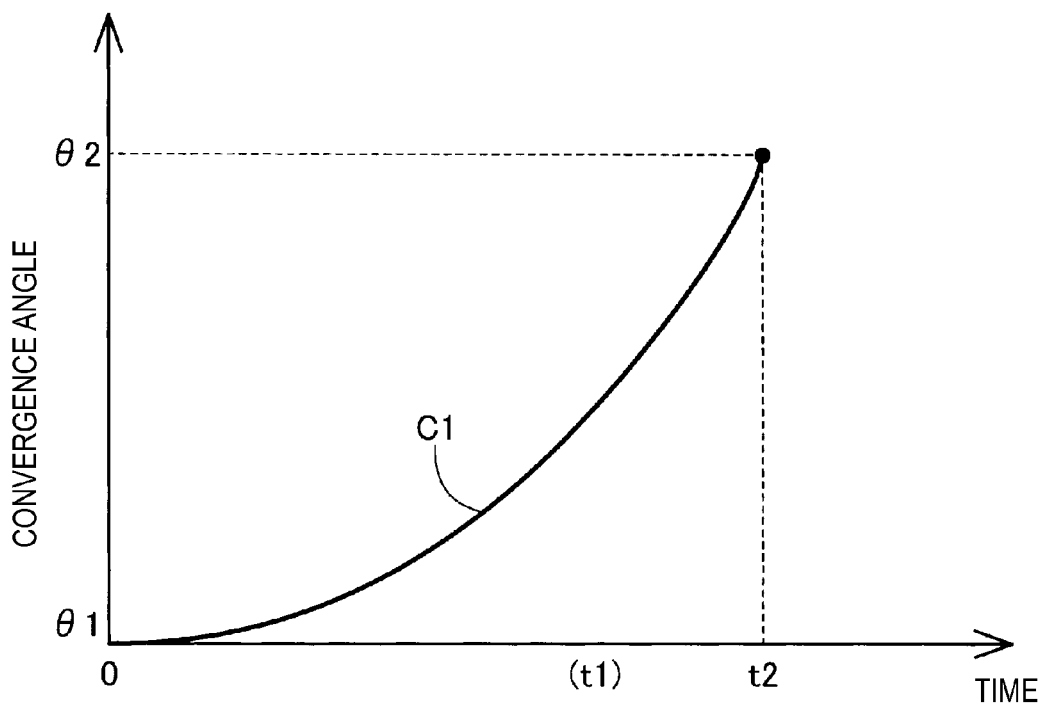
FIG. 3 is an explanatory diagram illustrating a relationship between a convergence angle and a time from the convergence angle before the change to the convergence angle after the change.

In a case where the distance to the center of the captured image before and after the change is equal to or greater than the threshold value as in the cases of (3) and (4), when the time that has elapsed before and after the change is a time t1, the image setting unit 165 causes the convergence angle to be changed from the convergence angle formed before the change to the convergence angle to be formed after the change over a time t2 which is longer than the time t1. FIG. 3 is an explanatory diagram illustrating a relationship between the time required for changing the convergence angle from the convergence angle $\theta 1$ before the change to the convergence angle $\theta 2$ after the change and the convergence angle. In FIG. 3, in a case where the convergence angle $\theta 1$ before the change is smaller than the convergence angle $\theta 2$ after the change, a curve C1 is illustrated, which changes from the convergence angle $\theta 1$ before the change to the convergence angle $\theta 2$ after the change as the time elapses. In other words, in the case where the convergence angle $\theta 1$ before the change is smaller than the convergence angle $\theta 2$ after the change, the related subject positioned at the center of the captured image after the change is present at a distance nearer than that before the change. In the present embodiment, the image setting unit 165 controls the increase of the convergence angle from the convergence angle $\theta 1$ before the change to the convergence angle $\theta 2$ after the change in a monotonous manner as the time elapses. In addition, as illustrated by the curve C1, the image setting unit 165 controls the increase of the convergence angle such that the amount of change of the convergence angle per unit time gradually increases. In the present embodiment, in reverse to the example illustrated in FIG. 3, in a case where the convergence angle changes from the convergence angle θ2 after the change to the convergence angle θ1 before the change, the image setting unit 165 controls the decrease of the convergence angle such that the amount of change of the convergence angle per unit time gradually increases as the time elapses, and that the curve representing the relationship between the time and the convergence angle gradually decreases. The image in which the convergence angle is changed from the convergence angle formed before the change to the convergence angle formed after the change by the image setting unit 165 over the time t2 which is longer than the time t1 may be a part of the image before the change. For example, the image setting unit 165 may change only the outline of the object included in the image or may change only the color of the image. In addition, in a case where the stereoscopically displayed image is an image in which the reflection of the brightness of the display image is changed, only the change of the reflection may be changed as the image.

In the case of (3), the image setting unit 165 causes the convergence angle of the 3D-image which is in association with the related subjects before and after the change in the time t2 which is longer than the elapsed time t1 before and after the change to be gradually changed, and then, after the time t2 is elapsed, causes the 3D-image that matches with the convergence angle corresponding to the distance to the related subject after the change to be displayed on the image display unit 20. In the case of (4), the image setting unit 165 causes the 3D-image which is in association with the related subject after the change to be displayed on the image display unit 20 after the time t2 which is longer than the time t1 elapsed from the time of captured image before the change to the time of captured image after the change. Therefore, in the case of (4), at the moment when the captured image is changed, the image setting unit 165 does not cause the 3D-image which is in association with the related subject after change to be newly displayed on the image display unit 20.

The interface 180 is an interface for connecting various external devices OA which are the supply sources of the content to the controller 10. As the external devices OA, a personal computer (PC), a mobile phone terminal, a game terminal, or the like can be exemplified. As the interface 180, for example, a USB interface, a micro USB interface, an interface for a memory card, or the like can be used.

The image display unit 20 includes the right display drive unit 22, the left display drive unit 24, the right light guide plate 261 as the right optical image display unit 26, the left light guide plate 262 as the left optical image display unit 28, and the camera 61.

The right display drive unit 22 includes a reception unit 53 (Rx 53), the right backlight control unit 201 (right BL control unit 201) and the right backlight 221 (right BL 221) that function as light sources, and the right LCD control unit 211 and the right LCD 241 that function as display elements, and the right projection optical system 251. The right backlight control unit 201 and the right backlight 221 function as light sources. The right LCD control unit 211 and the right LCD 241 function as display devices. The right backlight control unit 201, the right LCD control unit 211, the right backlight 221, and the right LCD 241 are collectively referred to as an "image generation unit".

The reception unit 53 functions as a receiver for serial transmission between the controller 10 and the image display unit 20. The right backlight control unit 201 drives the right backlight 221 based on the input control signal. The right backlight 221 is, for example, a light emitting device such as the LED or an electroluminescence (EL). The right LCD control unit 211 drives the right LCD 241 based on the clock signal PCLK input via the reception unit 53, the vertical synchronization signal VSync, the horizontal synchronization signal HSync, and image data for the right eye. The right LCD 241 is a transmission type liquid crystal panel on which a plurality of pixels is arrayed in a matrix shape.

The right projection optical system 251 is configured to include a collimator lens that makes the image light emitted from the right LCD 241 become a light flux of a parallel state. The right light guide plate 261 as the right optical image display unit 26 guides the image light emitted from the right projection optical system 251 to the right eye RE of the user while being reflected along a predetermined optical path. The right projection optical system. 251 and the right light guide plate 261 are collectively referred to as a "light guide unit".

The left display drive unit 24 has a configuration similar to that of the right display drive unit 22. The left display drive unit 24 includes a reception unit 54 (Rx 54), the left backlight control unit 202 (left BL control unit 202) and the left backlight 222 (left BL 222) that function as light sources, the left LCD control unit 212 and the left LCD 242 that function as display elements, and a left projection optical system 252. The left backlight control unit 202 and the left backlight 222 function as light sources. The left LCD control unit 212 and the left LCD 242 function as display elements. The left backlight control unit 202, the left LCD control unit 212, the left backlight 222, and the left LCD 242 are collectively referred to as an "image light generation unit". In addition, the left projection optical system 252 is configured to include the collimator lens that makes the image light emitted from the left LCD 242 become a light flux of a parallel state. The left light guide plate 262 as the left optical image display unit 28 guides the image light emitted from the left projection optical system 252 to the left eye LE of the user while being reflected along the predetermined optical path. The left projection optical system 252 and the left light guide plate 262 are collectively referred to as a "light guide unit".

Figure 4:
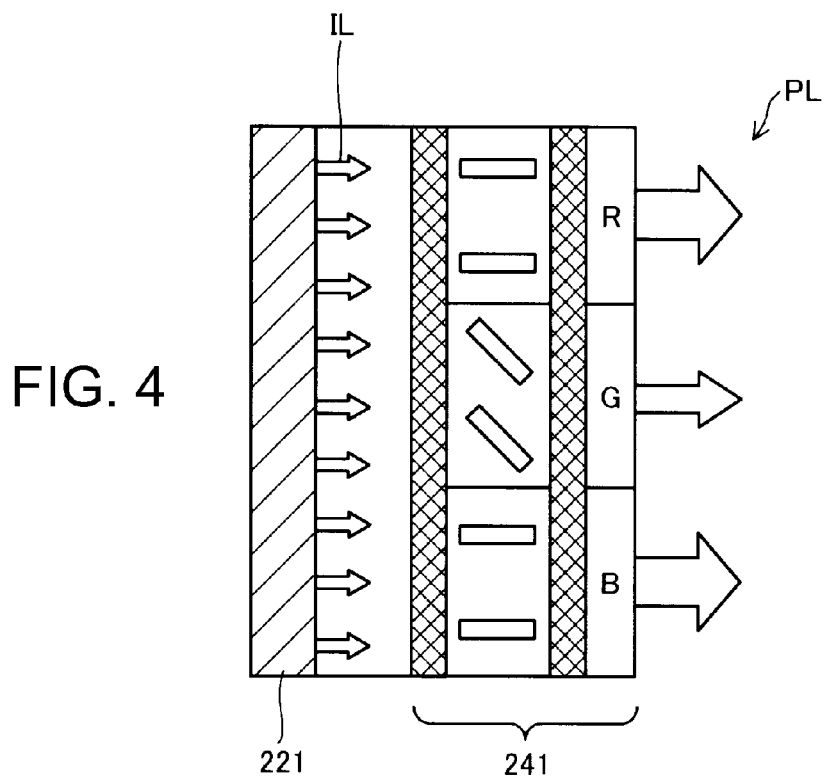
FIG. 4 is an explanatory diagram illustrating a state in which an image light is emitted by an image light generation unit.

FIG. 4 is an explanatory diagram illustrating a state in which an image light is emitted by the image light generation unit. The right LCD 241 changes the transmittance of the light transmitting the right LCD 241 by driving the liquid crystal at each pixel position arrayed in the matrix shape. As a result, the illumination light IL emitted from the right backlight 221 is modulated to an effective image light PL representing the image. The state in the left side is similar to that in the right side. As illustrated in FIG. 4, the backlight type is adopted in the present embodiment. However, the image light may be emitted using a configuration of a front light type or a reflection type.

A-2. Display Image Setting Processing

Figure 5:
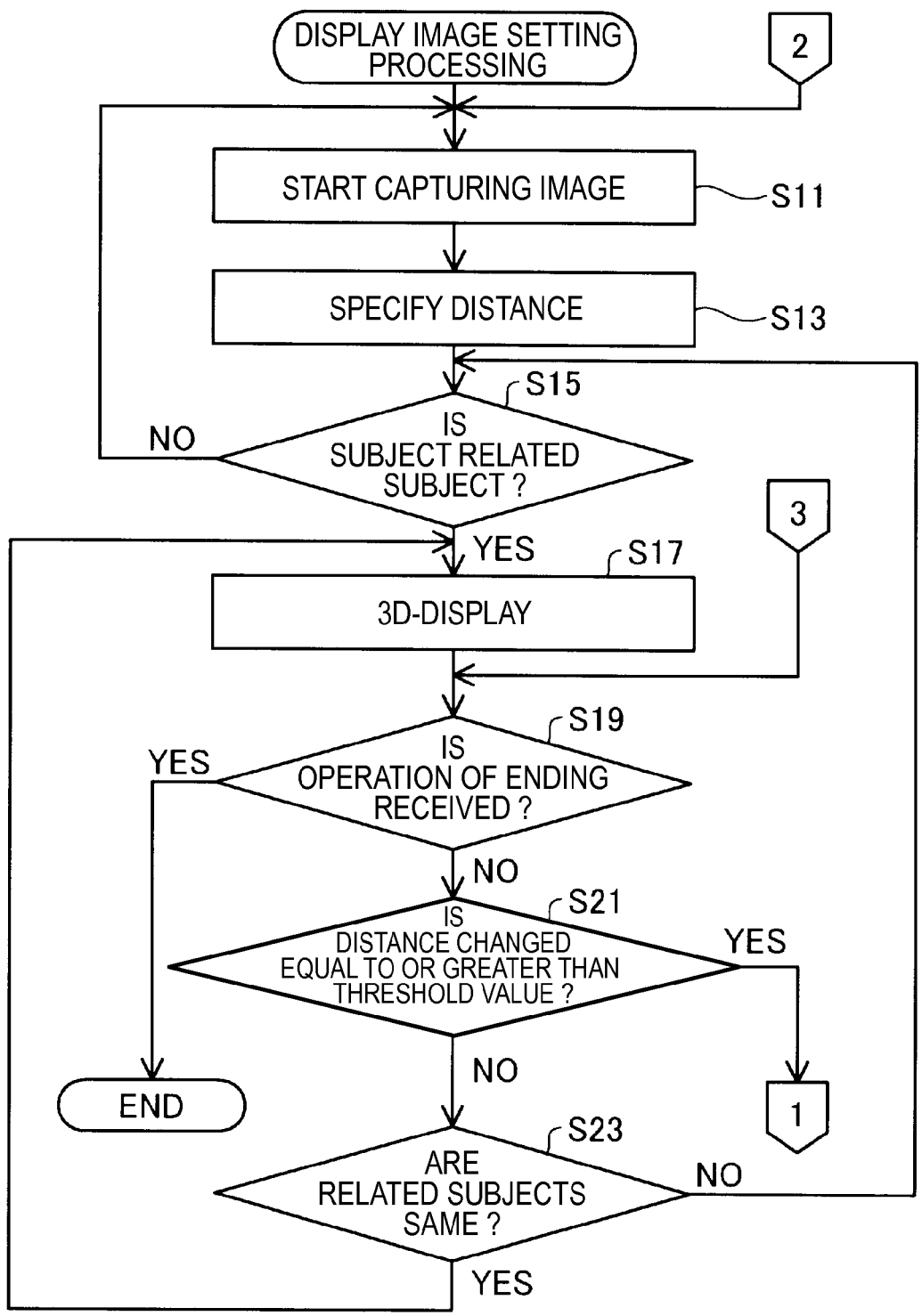
FIG. 5 is a flowchart for display image setting processing for displaying a 3D-image in association with a related subject.
Figure 6:
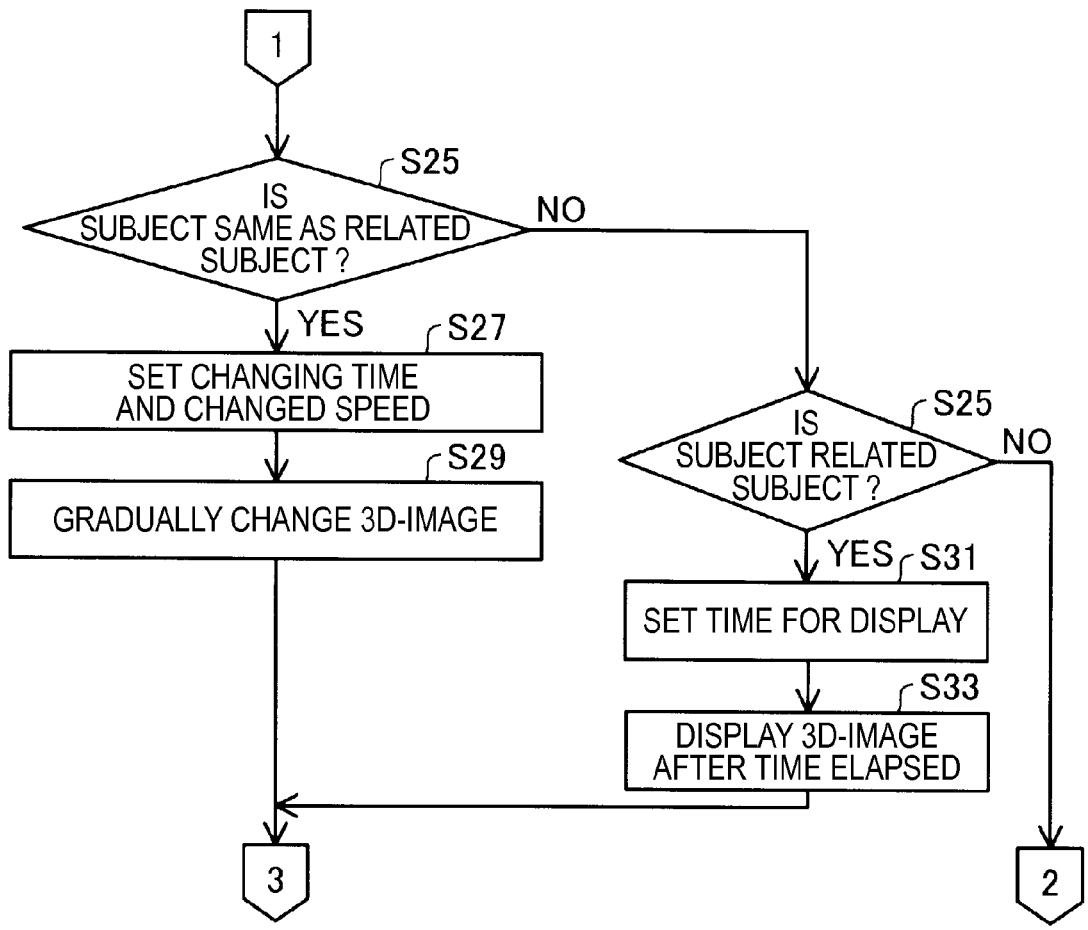
FIG. 6 is a flowchart for display image setting processing for displaying a 3D-image in association with a related subject.

FIG. 5 and FIG. 6 are flowcharts for display image setting processing for displaying the 3D-image in association with the related subject. The display image setting processing is processing in which the CPU 140 forms the convergence angle while matching with the distance to the related subject positioned at the center of the captured image, and causes the user to stereoscopically and visually recognize the 3D-image. In the display image setting processing, when the operation unit 135 receives an operation, the camera 61 starts capturing the image of outside scene (STEP S11). The distance specifying unit 168 specifies the distance from the image display unit 20 to the subject positioned at the center of the two different images captured by the camera 61 which is a stereo camera (STEP S13). The image setting unit 165 specifies the subject by performing a pattern matching on the subject appearing at the center of the specified captured image, and determines whether or not the specified subject is a related subject which is in association with the 3D image included in the content or the like (STEP S15). In a case where it is determined that the specified subject is not a related subject (NO in STEP S15), the CPU 140 repeats the processing tasks subsequent to STEP S11.

In the processing in STEP S15, in a case where it is determined that the subject appearing at the center of the captured image is a related subject (YES in STEP S15), the image setting unit 165 sets image data for right eye and image data for left eye such that the convergence angle is formed, and then, causes the 3D image which is in association with the related subject, to be stereoscopically displayed at the distance same to the related subject on the image display unit 20 (STEP S17).

Figure 7:
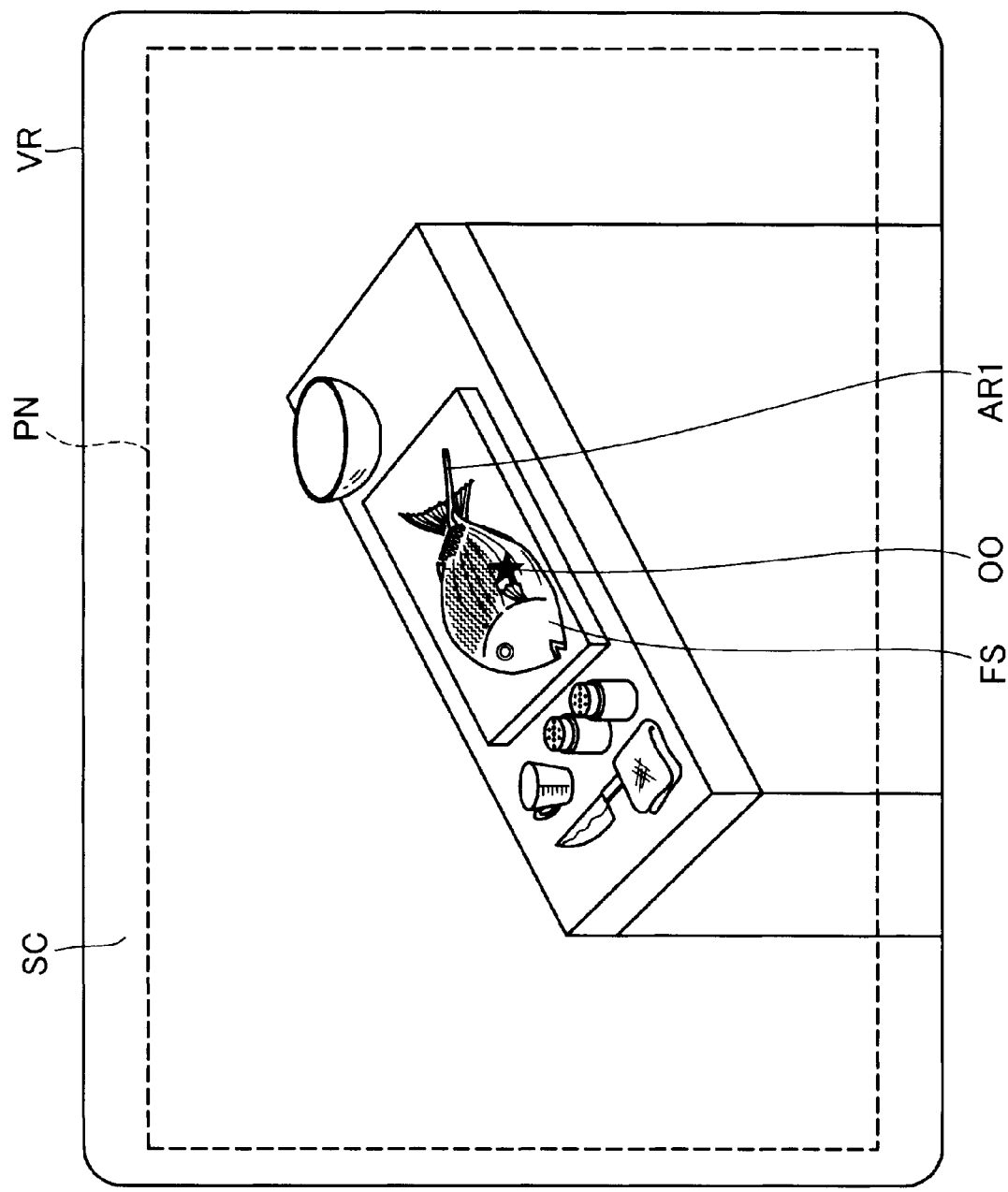
FIG. 7 is an explanatory diagram illustrating a field of view which is visually recognized by a user when the 3D-image in association with the related subject is displayed.

FIG. 7 is an explanatory diagram illustrating a field of view VR which is visually recognized by a user when the 3D-image in association with the related subject is displayed. As illustrated in FIG. 7, the outside scene SC which transmits the optical image display units 26 and 28 and an image of fish scale removing are included in the field view VR as a 3D-image AR1. A cutting board BC and a fish FS which is a related subject placed on the cutting board BC are included in the outside scene SC. The 3D-image AR1 is an image which is in association with the fish FS in the outside scene SC. In the present embodiment, the angle of view of the camera 61 are set in advance so as to be corresponding to the field of view of the user who wears the image display unit 20. In FIG. 7, for the convenience, an outer frame of an image display maximum region PN which is a maximum region for the image to be displayed on the image display unit 20 is illustrated by a dashed line, and the center of the captured image is illustrated by a pointer OO. Since the image display maximum region PN and the pointer OO are not displayed on the display unit, and thus, are not visually recognized by the user.

In the processing in STEP S17 in FIG. 5, when the 3D-image AR1 which is a 3D-image is displayed in the image display maximum region PN on the image display unit 20, the operation unit 135 monitors the reception of the operation of ending the display image setting processing (STEP S19). In a case where the operation of ending the display image setting processing is received (YES in STEP S19), the CPU 140 ends the display image setting processing.

In the processing in STEP S19, in a case where the operation of ending the display image setting processing is not received (NO in STEP S19), the image setting unit 165 determines whether or not the distance from the image display unit 20 specified by the distance specifying unit 168 to the subject at the center of the captured image is changed equal to or greater than the threshold value (STEP S21). In a case where it is determined that the distance from the image display unit 20 to the center of the captured image is changed less than the threshold value (NO in STEP S21), the image setting unit 165 determines whether or not the related subjects appearing at the center of the image captured by the camera 61 are the same (STEP S23). In a case where it is determined that the related subjects are the same (YES in STEP S23), the image setting unit 165 continuously causes the 3D-image AR1 which is in association with the related subject fish FS to be displayed in the image display maximum region PN (STEP S17). In the processing in STEP S23, in a case where it is determined that the related subjects are not the same (NO in STEP S23), the image setting unit 165 determines whether or not the subject positioned at the center of the image captured by the camera 61 is the related subject which is in association with the 3D-image (STEP S15).

In the processing in STEP S21, in a case where it is determined that the distance from the image display unit 20 to the center of the captured image is changed equal to or greater than the threshold value (YES in STEP S21), the image setting unit 165 determines whether or not the subject appearing at the center of the captured image after the change is same as the related subject before the change (STEP S25). In a case where it is determined that the subjects appearing at the center of the captured image before and after the change are the same related subjects (YES in STEP S25), the image setting unit 165 calculates the convergence angle to match with the distance from the image display unit 20 after change to the related subject, and then, sets a changing time it takes for the convergence angle to be changed to the convergence angle matched with the distance after the change and the changed speed per unit time (STEP S27). The image setting unit 165 causes the 3D-image AR1 which is in association with the related subject fish FS to be displayed while being gradually changed in the image display unit 20 based on the set changing time and the changed speed (STEP S29).

Figure 8:
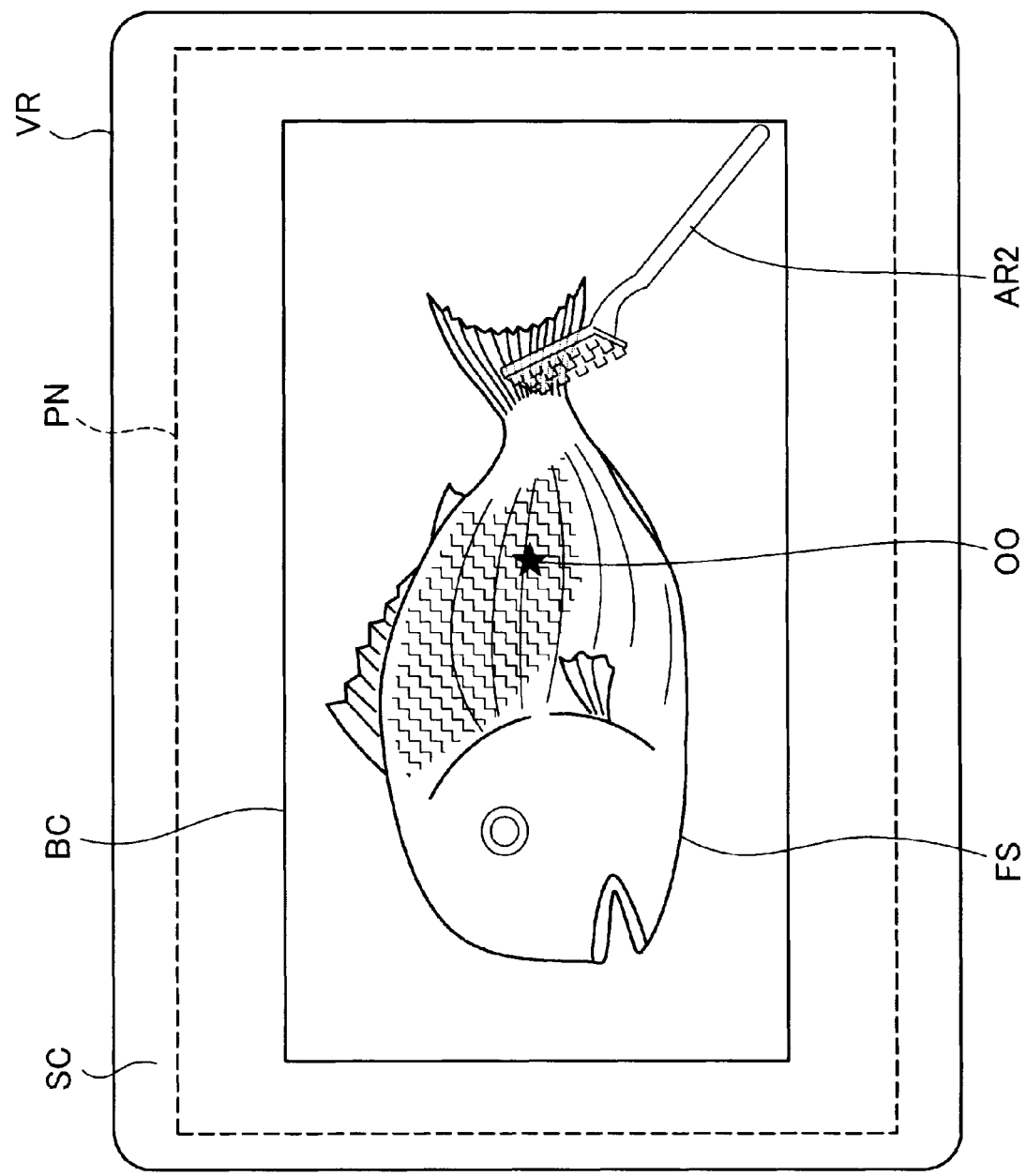
FIG. 8 is an explanatory diagram illustrating a field of view which is visually recognized by the user after the 3D-image in association with the related subject is changed.

FIG. 8 is an explanatory diagram illustrating the field of view VR which is visually recognized by the user after the 3D-image which is in association with the related subject is changed. In FIG. 8, the outside scene SC and a 3D-image AR2 are illustrated same as in FIG. 7. In FIG. 8, the distance between the image display unit 20 and the related subject fish FS is short compared to that in FIG. 7. As illustrated in FIG. 8, the image of the related subject fish FS is captured at the pointer OO on the captured image. For this reason, the image setting unit 165 causes the 3D-image AR2 which is in association with the fish FS to be displayed in the image display maximum region PN. Since the displaying is set such that the 3D-image is displayed in proportional to the size of the fish FS, the 3D-image AR2 is displayed larger than the 3D-image AR1 in FIG. 7. The image setting unit 165 causes the 3D-image to be displayed in the image display maximum region PN with gradually increasing the convergence angle as illustrated in FIG. 3 while the time changing from the time of 3D-image AR1 in FIG. 7 to the time of 3D-image AR2 in FIG. 8.

In the processing in Step S25 in FIG. 5, in a case where it is determined that the subjects appearing at the center of the captured image before and after the change are not the same related subjects (NO in STEP S25), the image setting unit 165 determines whether or not the subject appearing at the center of the captured image is the related subject (STEP S31). In a case where it is determined that the subject appearing at the center of the captured image is not the related subject which is in association with any of the 3D-images (NO in STEP S25), the CPU 140 repeats the processing tasks subsequent to STEP S11 in FIG. 5.

In the processing in STEP S25 in FIG. 6, in a case where it is determined that the subject appearing at the center of the captured image is any of the related subjects (YES in STEP S25), the image setting unit 165 calculates the time t2 required for the 3D-image which is in association with the new related subject to be displayed in the image display maximum region PN (STEP S31). In this case, the image setting unit 165 causes the 3D-image AR1 which is in association with the fish FS that is the related subject before the change to be removed from the image display maximum region PN. In other embodiments, in a case where the fish FS is continuously detected in the capture image, the image setting unit 165 may cause the 3D-image AR1 to be displayed in the image display maximum region PN according to the position of the detected fish FS.

When the time t2 required for the 3D-image which is in association with the new related subject to be displayed in the image display maximum region PN has elapsed, the image setting unit 165 causes the 3D-image to be displayed in the image display maximum region PN (STEP S33). Thereafter, the CPU 140 repeats the processing tasks subsequent to STEP S19 in FIG. 5.

As described above, in the HMD 100 in the present embodiment, the distance specifying unit 168 specifies the distance to the related subject based on the image captured by the camera 61, and the image setting unit 165 forms the convergence angle such that the user can visually and stereoscopically recognize the 3D-image at the specified distance. In a case where the specified distance is changed, the image setting unit 165 causes the convergence angle to be changed from the convergence angle θ1 to the convergence angle θ2 over the time t2 which is longer than the time t1 required for the measured distance to be changed. For this reason, in the HMD 100 in the present embodiment, even when the distance to the subject in the outside scene SC which is visually recognized by the user is changed, the 3D-image is not instantaneously displayed according to the distance after the change. Therefore, it is possible to suppress the tiredness of the user in a case where the user changes his/her line of sight. In addition, it is possible to reduce the feeling of discomfort due to the change of the 3D-images which are visually recognized by the user before and after changing the line of sight.

in addition, in the HMD 100 in the present embodiment, since the subject appearing at the center of the image captured by the camera 61 is specified as the outside scene of the outside scene SC which is visually recognized by the user, it is possible to easily estimate the position where the user is visually recognizing the outside scene without detecting the state of eyeballs of the user.

In addition, in the HMD 100 in the present embodiment, in a case where the distance to the specified related subject is changed, when the amount of change of the distance between the image display unit 20 and the related subject before and after the change is less than the threshold value, the image setting unit 165 does not change the distance in which the 3D-image which is in association with the related subject can be stereoscopically displayed. In other words, in a case where the distance to the specified related subject is changed equal to or greater than the predetermined amount, the image setting unit 165 causes the convergence angle of the 3D-image to be changed and causes the 3D-image to be stereoscopically displayed on the image display unit 20. Therefore, in the HMD 100 in the present embodiment, in a case where the amount of change of the distance to the subject in the outside scene SC which is visually recognized by the user is small, the distance from the user displaying the 3D-images is not changed. Therefore, it is possible to reduce the flickering of the image or the like generated by a minute change of the 3D-image.

In addition, in the HMD 100 in the present embodiment, as illustrated in FIG. 3, in a case where the distance to the specified related subject is changed, the image setting unit 165 performs the control such that the amount of changes of the convergence angle per unit time gradually increases in a case where the convergence angle formed when the 3D-image is displayed is changed from the convergence angle θ1 before the change to the convergence angle θ2 after the change. Therefore, in the HMD 100 in the present embodiment, it is possible to further reduce the feeling of tiredness or discomfort to the user visually recognizing the 3D-image of which the convergence angle is changed.

In addition, in the HMD 100 in the present embodiment, the image setting unit 165 causes the image data for the right eye and the image data for the left eye to be displayed on the image display unit 20 such that the convergence angle is formed, and thus, the 3D-image is displayed at the distance to the related subject so as to be stereoscopically and visually recognized by the user. Therefore, in the HMD 100 in the present embodiment, by changing the position of the pixels of the 3D-image displayed on the right optical image display units 26 and 28 such that a predetermined convergence angle is formed, it is possible to easily cause the 3D-image to be stereoscopically and visually recognized by the user.

B. Modification Example

The invention is not limited to the embodiment described above and various aspects can be embodied without departing from the spirit thereof. For example, the following modification can also be possible.

B-1. Modification Example 1

Figure 9:
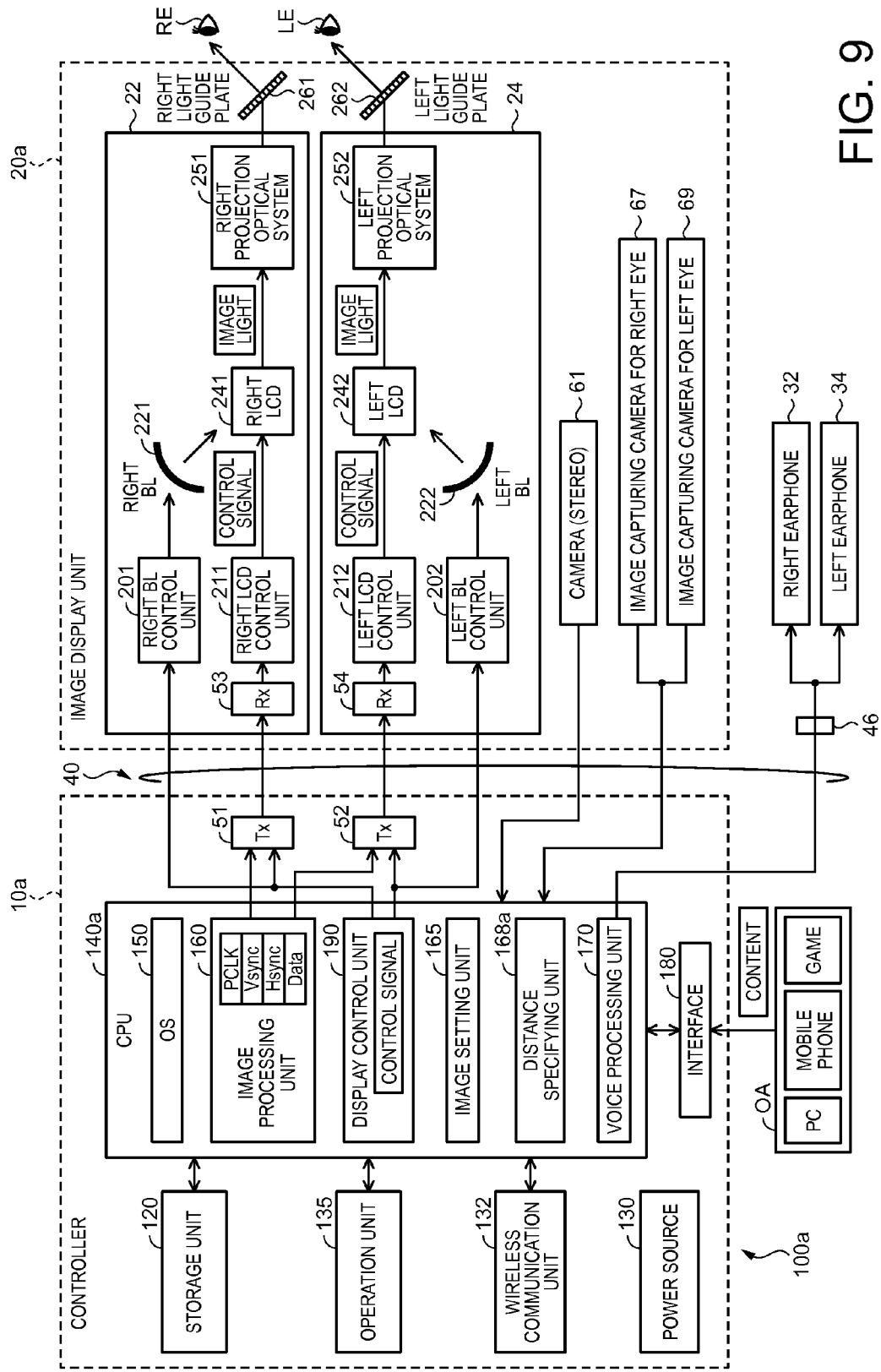
FIG. 9 is a block diagram functionally illustrating a configuration of the HMD in a modification example.

FIG. 9 is a block diagram functionally illustrating a configuration of the HMD 100a in a modification example. In the modification example, a measuring method for distance to a subject existing at a specific position in the outside scene SC is different from that in the embodiment described above, and other configurations are the same as that in the embodiment described above. As illustrated in FIG. 9, in the image display unit 20a in the modification example, a right eye image capturing camera 67 and a left eye image capturing camera 69 are included. The right eye image capturing camera 67 captures an image of a right eye RE of the user who wears the image display unit 20a and the left eye image capturing camera 69 captures an image of a left eye LE of the user. Differently from that in the embodiment described above, a distance specifying unit 168a specifies the position where the user is visually recognizing based on the image of the right eye RE and the left eye LE of the user captured by the right eye image capturing camera 67 and the left eye image capturing camera 69, and specifies the distance to that position. The distance specifying unit 168a specifies the direction of line of sight of the user by performing a pattern matching on the captured image of the right eye RE and the left eye LE of the user. The distance specifying unit 168a specifies a position at which the user is looking based on the specified line of sight, and then, specifies the distance to the position. The image setting unit 165a causes a 3D-image which is in association with the subject appearing on the image specified by the distance specifying unit 168a and captured by the camera 61 to be displayed on the image display unit 20a. Therefore, differently from the embodiment described above, since the image setting unit 165a causes the 3D-image to be displayed on the image display unit 20*a* based on the direction of the line of sight of the user, the 3D-image can be displayed on the position other than the position of pointer OO in the image display maximum region PN. In this modification example, since the distance to the related subject is not specified by the image captured by the camera 61, the camera 61 may not be a stereo camera. In the HMD 100*a* in this modification example, since the direction of line of sight of the user is also specified by the right eye image capturing camera 67 and the left eye image capturing camera 69 in addition to the distance to the related subject, a degree of freedom of the position for displaying the 3D-image is increased, and thus, the usability of the user is improved. The right eye image capturing camera 67 and the left eye image capturing camera 69 correspond to an eye image capturing unit in an aspect of the invention.

B-2. Modification Example 2

In the embodiment described above, in a case where the distance to the specified related subject is changed, by comparing the distance to the specified related subject and the threshold value, it is determined whether or not the convergence angle of the 3D-image is changed. However, the method of setting the convergence angle of the 3D-image can be variously modified. For example, the image setting unit 165 may set the convergence angle of the 3D-image by causing the distance to the specified related subject to be in correspondence with a relationship with an estimated time during which the user continues to visually recognize the related subject. Specifically, in a case where the distance to the specified related subject is changed by equal to or greater than the threshold value, when the time elapses equal to or longer than a first threshold value in a state of the distance before the change, the image setting unit 165 does not immediately change the convergence angle to a convergence angle corresponding to the distance after the change. In a case where the time elapses equal to or longer than a second threshold value in a state of the distance after the change, the image setting unit 165 changes the convergence angle to a convergence angle corresponding to the distance after the change. In this modification example, for example, when the user is looking at almost constant distance during the time equal to or longer than the first threshold value and instantaneously looking away, since the convergence angle of the 3D-image is not changed following the look-away, it is possible to reduce the tiredness and the feeling of discomfort of the user.

B-3. Modification Example 3

In the embodiment described above, the distance to the subject positioned on the pointer OO which is the center of the image captured by the camera 61. However, the convergence angle of the 3D-image is not necessarily set based on the subject at the center of the image captured by the camera 61. For example, in a case where the position relationship between the image display unit 20 and the specific dangerous object is fixed in a factory or the like, the convergence angle of the 3D-image may be set based on the subject positioned at the position other than the center of the image captured by the camera 61.

In the embodiment described above, in a case where the distance to the related subject appearing at the center of the image captured by the camera 61 is changed, the threshold value of the distance to the related subject before and after the change is described with an example of 10%. However, the threshold value is not limited to that number, and can be variously modified. For example, the threshold value may be 5% or 20%, or may not be set. In a case where the threshold value is not set, the image setting unit 165 may change the convergence angle of the 3D-image at each time regardless of the amount of change in the distance to the related subject.

B-4. Modification Example 4

Figure 10:
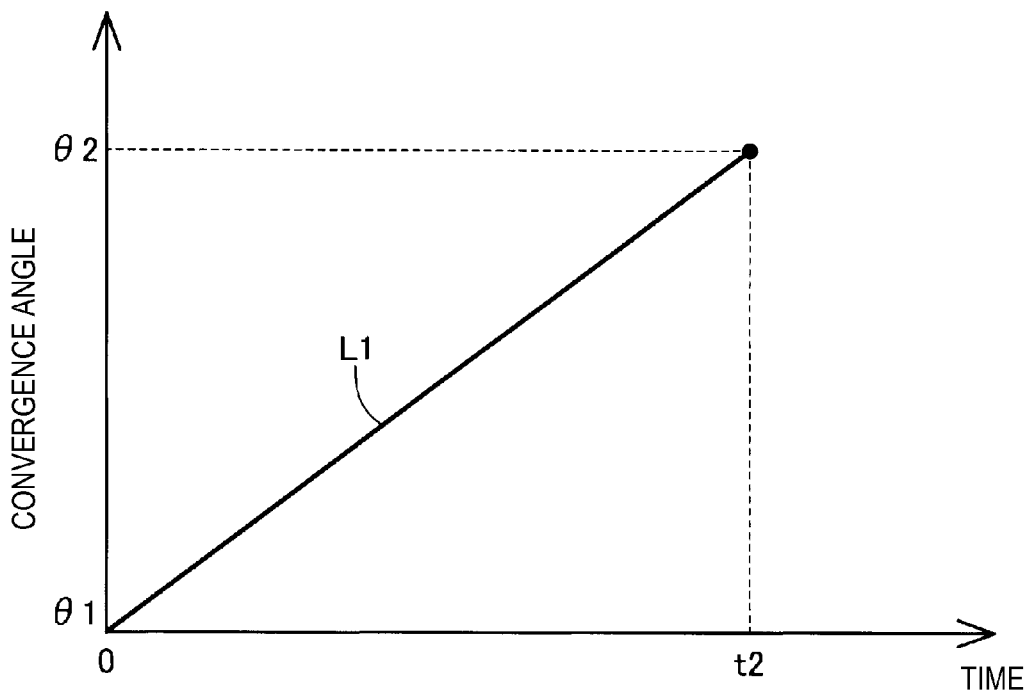
FIG. 10 is an explanatory diagram illustrating a relationship between a convergence angle and a time from the convergence angle before the change to the convergence angle after the change in the modification example.
Figure 11:
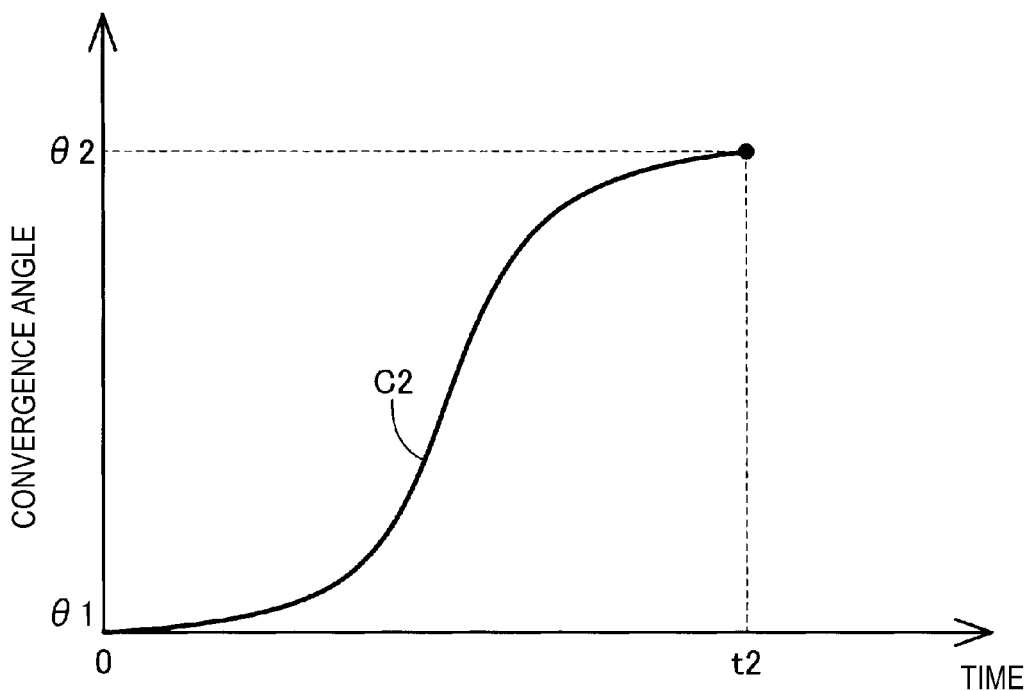
FIG. 11 is an explanatory diagram illustrating a relationship between a convergence angle and a time from the convergence angle before the change to the convergence angle after the change in the modification example.

In the embodiment described above, the example in FIG. 3 is described as the change of the convergence angle associated with the time in a case where the distance to the related subject appearing at the center of the image captured by the camera 61 is changed. However, the change of the convergence angle associated with the time is not limited thereto and various modifications can be made. FIG. 10 and FIG. 11 are explanatory diagrams illustrating relationships between the convergence angle and the time from the convergence angle θ1 before the change to the convergence angle θ2 after the change in the modification example. As illustrated in FIG. 10, the image setting unit 165 may set the change of the convergence angle from the convergence angle θ1 before the change to the convergence angle θ2 after the change associated with the time for the specified distance as a gradually increasing linear change such as a line L1. In addition, as illustrated in FIG. 11, the image setting unit 165 may set the change of the convergence angle from the convergence angle θ1 before the change to the convergence angle θ2 after the change associated with the time such that the amount of change of the convergence angle per unit time during the time from immediately after the starting of the change of the convergence angle to the time of ending the change becomes small such as a curve C2.

In addition, in the embodiment described above, the change from the convergence angle θ1 to the convergence angle θ2 which is greater than convergence angle θ1 is described. However, a speed of the change of the distance per a unit in an aspect of the invention includes an absolute value of the speed of the change. Therefore, a change in which the convergence angle gradually decreases such as a change from the convergence angle θ2 to the convergence angle θ1 which is smaller than convergence angle θ2 is also included in the gradual increase of the speed of the change of the distance in the aspect of the invention.

In the embodiment described above, as a method for measuring the distance to the subject as the specific position, the image captured by the stereo camera or the image captured by the right eye image capturing camera 67 and the left eye image capturing camera 69 that capture the image of the user's eye are used. However, the method for measuring the distance be variously modified. For example, the distance to a specific point may be measured using a time-of-flight (TOF) method. In addition, the distance to the specific point may be measured by capturing the outside scene SC using an infrared camera and then, processing the data of countless points of the infrared light reflected from the surface of the object.

In the embodiment described above, the scale removing image which is actually present as an object is displayed on the image display unit 20 as the 3D-images AR1 and AR2. However, the type of the images displayed as the 3D-images can be variously modified. For example, a text image in which a character is expressed may be displayed on the image display unit 20 as the 3D-image. In this case, the head mounted display device 100 may cause the text image to be visually recognized as a stereoscopic image by the user by being displayed on the image display unit 20 while being shaded, not by the convergence angle.

B-5. Modification Example 5

In the embodiment described above, the operation unit 135 is formed in the controller 10. However, the aspect of the operation unit 135 can be variously modified. For example, it may be an aspect having a user interface which is the operation unit 135 separate from the controller 10. In this case, since the operation unit 135 is separate from the controller 10 on which the power source 130 or the like is formed, it is possible to miniaturize the size, thereby improving the operability of the user. In addition, the camera 61 is disposed on the image display unit 20. However, the camera 61 may be configured separate from the image display unit 20 so as to be able to capture the outside scene SC. In the HMD 100, both of the CPU 140 and the power source 130 that configure the controller 10 may be mounted on the image display unit 20. In this HMD 100, since there is no controller that is configured separate from the image display unit 20, it is possible to further miniaturize the size. By mounting the CPUs 140 on each of the controller 10 and the image display unit 20, the controller 10 may be used as a single-body controller and the image display unit 20 may be used as a single-body display device.

For example, the image light generation unit may be configured to include an organic electro-luminescence (organic EL) display and an organic EL control unit. In addition, for example, the image light generation unit can use, instead of an LCD, liquid crystal on silicon (LCOS®), a digital micro-mirror device, or the like. In addition, for example, it is also possible to apply the invention to a laser retina projection type HMD 100. In addition, the image display maximum region PN may be formed of a MEMS shutter type display which opens and closes the MEMS shutter formed in each pixel.

In addition, for example, the HMD 100 may be a head mounted display having an aspect in which an optical image display unit covers only a part of the eyes of the user, in other words, an aspect in which the optical image display unit does not completely cover the eyes of the user. In addition, the HMD 100 may be a so-called monocular type head mounted display. In addition, instead of the HMD 100, a hand held display may be used as the image display device such as binoculars, which is not mounted on the head of the user but in which the user fixes the position by hand. In addition, the HMD 100 is a binocular and optical transmission type. However, the invention can similarly be applied to a head mounted display device of another type such as a video transmission type.

In addition, the HMD 100 may be used as a display device only for displaying an image which is based on an image signal received from another device. Specifically, the HMD 100 may be used as a display device corresponding to a monitor of a desktop type PC. For example, by receiving an image signal from the desktop type PC, the image may be displayed on the image display maximum region PN of the image display unit 20.

In addition, the HMD 100 may be used so as to function as a part of the system. For example, the HMD 100 may be used as a device that executes a part of functions of a system including an aircraft. The system in which the HMD 100 is used is not limited to the system including the aircraft, but may be a system including a vehicle, a bicycle, or the like.

In addition, an ear-hook type earphone or a headband type earphone may be adopted, or the earphone may be omitted.

In addition, for example, the head mounted display device may be configured so as to be mounted on a vehicle such as an automobile or an airplane. In addition, for example, the head mounted display device may be configured so as to be built in a body protector such as a helmet.

B-6. Modification Example 6

The configuration of the HMD 100 in the embodiment described above is only an example and various modifications can be made. For example, the direction key 16 provided on the controller 10 may be omitted or another operational interface such as an operational stick may be provided in addition to the direction key 16 and the track pad 14. In addition, the controller 10 has a configuration such that input devices such as a keyboard or a mouse can be connected. The controller 10 may receive the input from the keyboard or the mouse.

In addition, as an image display unit, instead of the image display unit 20 mounted like eyeglasses, for example, another type of image display unit such as an image display unit that is mounted like a cap may be adopted. In addition, the earphones 32 and 34 can be omitted. In addition, in the embodiment described above, the LCD and the light source are used for the configuration to generate the image light. However, instead thereof, another display element such as an organic EL display may be adopted.

Figure 12A:
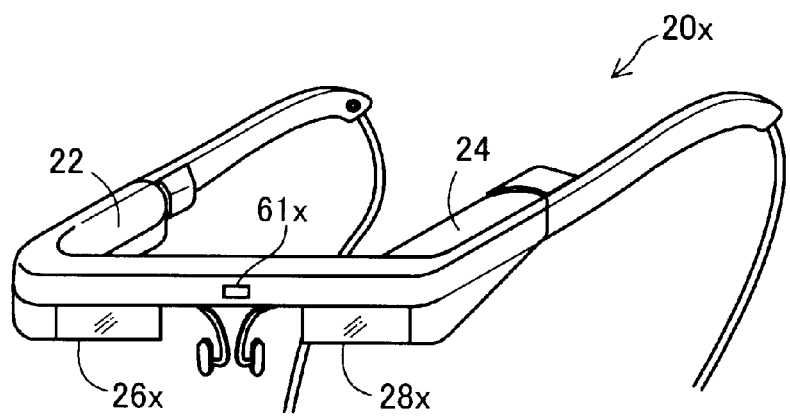
FIGS. 12A and 12B are explanatory diagrams illustrating external configurations of the HMD in the modification example.
Figure 12B:
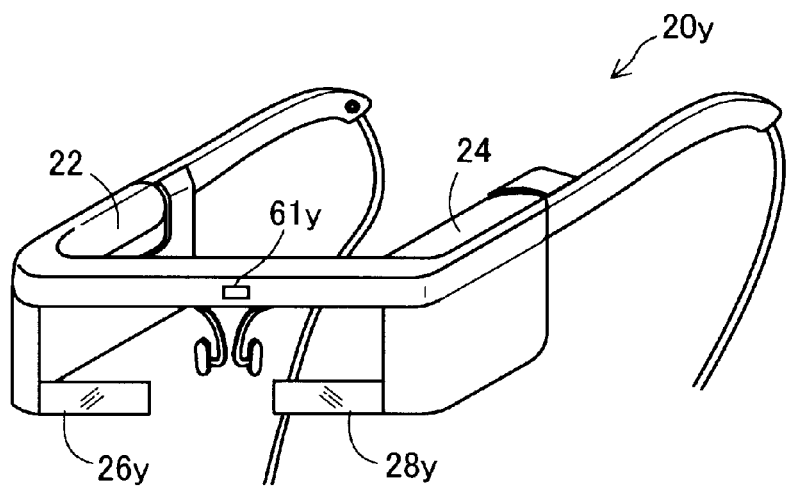

FIGS. 12A and 12B are explanatory diagrams illustrating an external configuration of the HMD in the modification example. In a case of an example in FIG. 12A, the configuration of the HMD in the modification example is different from the HMD 100 illustrated in FIG. 1 in a point that: an image display unit 20x includes a right optical image display unit 26x instead of the right optical image display unit 26, and includes a left optical image display unit 28x instead of the left optical image display unit 28. The right optical image display unit 26x is formed smaller than the optical member in the embodiment described above, and is disposed diagonally upward from the right eye of the user when mounting the HMD 100x. Similarly, the left optical image display unit 28x is formed smaller than the optical member in the embodiment described above, and is disposed diagonally upward from the left eye of the user when mounting the HMD 100x. In a case of an example in FIG. 12B, the configuration of the HMD in the modification example is different from the HMD 100 illustrated in FIG. 1 in a point that: an image display unit 20y includes a right optical image display unit 26y instead of the right optical image display unit 26, and includes a left optical image display unit 28y instead of the left optical image display unit 28. The right optical image display unit 26y is formed smaller than the optical member in the embodiment described above, and is disposed diagonally downward from the right eye of the user when mounting the head mounted display. The left optical image display unit 28y is formed smaller than the optical member in the embodiment described above, and is disposed diagonally downward from the left eye of the user when mounting the head mounted display. In this way, it is sufficient if the optical image display units are disposed in the vicinity of the eyes of the user. In addition, the size of the optical member that forms the optical image display unit is also optional, and thus, it is possible to realize the aspect of the HMD 100 such that the optical image display unit covers only a part of the eyes of the user, in other words, such that the unit does not completely cover the eyes of the user.

In addition, in the embodiment described above, the HMD 100 may guide an image light representing the same images to the right and left eyes of the user such that the user visually recognizes two-dimensional images, or may guide an image light representing the different images to the right and left eyes of the user such that the user visually recognizes three-dimensional images.

In addition, in the embodiment described above, a part of the configuration that is implemented by hardware may be replaced by software, or conversely, a part of the configuration that is implemented by software may be replaced by hardware. For example, in the embodiment described above, the functions of the image processing unit 160 and the voice processing unit 170 are implemented by the CPU 140 reading and executing the computer program. However, theses function units may be implemented by a hardware circuit.

In addition, in a case where a part or all of the functions of the invention is implemented by software, the software (computer program) can be provided in the form of being stored in a computer-readable storage medium. In the invention, "the computer-readable storage medium" is not limited to a portable type storage medium such as a flexible disk or CD-ROM but includes an internal storage device in a computer such as various RAM, ROM or the like or an external storage device fixed to the computer such as a hard disk.

In addition, in the embodiment described above, as illustrated in FIG. 1 and FIG. 2, the controller 10 and the image display unit 20 are configured to be separated from each other. However, the configuration of the controller 10 and the image display unit 20 is not limited thereto and various modifications can be made. For example, all of the configurations formed in the controller 10 may be formed in the image display unit 20 or a part thereof may be formed in the image display unit 20. In addition, the power source 130 in the embodiment described above may have a configuration of being independently formed and being replaceable, or the power source 130 may be formed in a duplicated manner in the image display unit 20 in addition to the configuration of being formed in the controller 10. For example, the CPU 140 illustrated in FIG. 2 may be formed on both of the controller 10 and the image display unit 20, or the functions performed by the CPU 140 formed in the controller 10 and the CPU formed in the image display unit 20 may be separately divided.

The invention is not limited to the embodiment and the modification examples described above and can be implemented by various modifications without departing from the spirit of the invention. For example, the technical features in the embodiment and the modification examples corresponding to the technical features in each aspect described in the SUMMARY can appropriately be replaced or combined in order to achieve a part or all of the effects described above. In addition, if the technical features are not described as essential herein, the technical features may appropriately be deleted.

The entire disclosure of Japanese Patent Application No. 2014-243775, filed Dec. 2, 2014 is expressly incorporated by reference herein.

What is claimed is:

1. A transmission type head mounted display device comprising:
   a processor that is configured to serve at least as:
      a distance measuring unit that measures a distance to a specific point in an outside scene;
      an image display unit that is capable of transmitting the outside scene and displays an image; and
      an image setting unit that controls the image display unit such that the image can be stereoscopically displayed at a position of measured distance, and in a case where the measured distance is changed, sets the image stereoscopically displayed at the position of the distance measured before the change as the image to be stereoscopically displayed at the position of the distance measured after the change over a time longer than a time required for the measured distance to be changed.

2. The head mounted display device according to claim 1, wherein the distance measuring unit includes an outside scene imaging unit that captures an image of the outside scene and sets a center of the captured image as the specific point.

3. The head mounted display device according to claim 2, wherein, in a case where the change of the distance to the center of the captured image is less than a predetermined distance, the image setting unit does not change the distance at which the image is stereoscopically displayed on the image display unit.

4. The head mounted display device according to claim 3, wherein, in a case where an amount of change of the measured distance is equal to or greater than the predetermined distance and in a case where a time to change is equal to or longer than a first threshold value, the image setting unit fixes the distance stereoscopically displayed on the image display unit to be the distance measured before the change, and in a case where a time elapses longer than a second threshold value from the time when measured distance is changed by equal to or greater than the predetermined distance, the image setting unit sets the distance of the image stereoscopically displayed on the image display unit to be the measured distance after the change.

5. The head mounted display device according to claim 2, wherein the distance measuring unit extracts an image of a specific subject from the captured image of the outside scene and specifies the distance to the extracted specific subject as a distance to the specific point, and
wherein the image setting unit sets an image to be stereoscopically displayed on the image display unit according to the extracted image of the specific subject.

6. The head mounted display device according to any one of claim 1,
wherein the distance measuring unit includes an eye image capturing unit that captures images of the user's eyes, and measures the distance to the specific point based on the captured images of the eyes.

7. The head mounted display device according claim 1, wherein, in a case where the distance of the image stereoscopically displayed on the image display unit is changed, the image setting unit sets a speed of the change of the distance per a unit time so as to gradually increase.

8. The head mounted display device according to claim 1, wherein the image setting unit causes the image displayed on the image display unit to be stereoscopically displayed at the position of the measured distance by setting a convergence angle between an image for right eye and an image for left eye which is different from the image for right eye with respect to the image stereoscopically displayed on the image display unit.

9. The head mounted display device according to claim 8, wherein, in a case where the convergence angle when the measured distance is changed is equal to or greater than a predetermined angle, the image setting unit changes the distance of the image stereoscopically displayed on the image display unit.

10. A control method for a head mounted display device including an image display unit that is capable of transmitting the outside scene and displays an image, the method comprising:
- measuring a distance to a specific point in an outside scene; and
- controlling the image display unit such that the image can be stereoscopically displayed at a position of measured distance, and in a case where the measured distance is changed, setting the image stereoscopically displayed at the position of the distance measured before the change as the image to be stereoscopically displayed at the position of the distance measured after the change over a time longer than a time required for the measured distance to be changed.

11. A non-transitory computer-readable medium comprising a computer program for a transmission type head mounted display device including an image display unit that is capable of transmitting the outside scene and displays the image, the program causing the computer to implement:
- a function of measuring a distance to a specific point in an outside scene;
- a function of controlling the image display unit such that the image can be stereoscopically displayed at a position of measured distance, and in a case where the measured distance is changed, setting the image stereoscopically displayed at the position of the distance measured before the change as the image to be stereoscopically displayed at the position of the distance measured after the change over a time longer than a time required for the measured distance to be changed.

* * * * *